United States Patent
Fleizach et al.

(10) Patent No.: US 9,146,617 B2
(45) Date of Patent: Sep. 29, 2015

(54) ACTIVATION OF A SCREEN READING PROGRAM

(71) Applicant: Apple Inc., Cupertino, CA (US)

(72) Inventors: Christopher Fleizach, Morgan Hill, CA (US); Eric T. Seymour, San Jose, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 13/781,566

(22) Filed: Feb. 28, 2013

(65) Prior Publication Data

US 2014/0215410 A1     Jul. 31, 2014

Related U.S. Application Data

(60) Provisional application No. 61/757,038, filed on Jan. 25, 2013.

(51) Int. Cl.
| | |
|---|---|
| G06F 3/048 | (2013.01) |
| G06F 3/0487 | (2013.01) |
| G06F 3/0488 | (2013.01) |
| G06F 3/01 | (2006.01) |
| G06F 3/16 | (2006.01) |

(52) U.S. Cl.
CPC ............... *G06F 3/017* (2013.01); *G06F 3/016* (2013.01); *G06F 3/048* (2013.01); *G06F 3/0487* (2013.01); *G06F 3/0488* (2013.01); *G06F 3/167* (2013.01)

(58) Field of Classification Search
CPC ..... G06F 3/048; G06F 3/0487; G06F 3/0488; G06F 3/016; G06F 3/167; G06F 3/017
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2012/092063 A1 | 7/2012 |

OTHER PUBLICATIONS

Swan, Henny. "Talk is cheap—screen reader testing on mobile", published on Dec. 2, 2011.*

(Continued)

*Primary Examiner* — Ting Lee
(74) *Attorney, Agent, or Firm* — Morrison & Foerster LLP

(57) ABSTRACT

Systems and processes for activating a screen reading program are disclosed. One process can include receiving a request to activate the screen reading program and prompting the user to perform an action to confirm the request. The action can include a making swiping gesture, shaking the device, covering a proximity sensor, tapping a display, or the like. In some examples, the confirming action must be received within a time limit or the input can be ignored. In response to receipt of the confirmation (e.g., within the time limit), the screen reading program can be activated. The time limit can be identified using audible notifications at the start and end of the time limit. In another example, a device can detect an event associated with a request to activate a screen reading program. The event can be detected at any time to cause the device to activate the screen reading program.

24 Claims, 11 Drawing Sheets

(56) References Cited

U.S. PATENT DOCUMENTS

| | | | |
|---|---|---|---|
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,051,096 | B1 * | 5/2006 | Krawiec et al. ............... 709/223 |
| 7,170,977 | B2 | 1/2007 | Doherty et al. |
| 7,184,064 | B2 | 2/2007 | Zimmerman et al. |
| 7,614,008 | B2 | 11/2009 | Ording |
| 7,663,607 | B2 | 2/2010 | Hotelling et al. |
| 8,479,122 | B2 | 7/2013 | Hotelling et al. |
| 2005/0273778 | A1 * | 12/2005 | Bixler ........................... 717/165 |
| 2006/0197753 | A1 | 9/2006 | Hotelling |
| 2008/0119217 | A1 * | 5/2008 | Coxhill ...................... 455/550.1 |
| 2010/0309147 | A1 * | 12/2010 | Fleizach et al. ............... 345/173 |
| 2011/0078611 | A1 | 3/2011 | Caligari et al. |

OTHER PUBLICATIONS

Stark, Jeffrey. "A Blind Trek Through Android—Part 1: Unwrapping the Jelly Bean (Getting Started)", published on Jul. 31, 2012.*

Youtube video titled "Android 4.0 Accessibility Demo: Turning on Accessibility" (https://www.youtube.com/watch?v=3DeprwFkl3U), posted by Google Nexus on Nov. 18, 2011.*

Stark, Jeffrey. "A Blind Trek Through Android—Part 1: Unwrapping the Ice Cream sandwich (Getting Started)", published on May 4, 2012.*

Anonymous. (2013). "ClickToPhone for Android Phone or Tablet Configurator," located at <http://www.boradenedhorizons.com/clicktophone>, last visited Feb. 19, 2013, 7 pages.

Miró-Borrás, J. et al. (2008). "E-Everything for All: Text Entry for People with Severe Motor Disabilities," *CollECTeR Iberoamérica*, 7 pages.

Shein, G.F. (1997). "Towards Task Transparency in Alternative Computer Access: Selection of Text Through Switch-Based Scanning," Doctor of Philosophy Degree Thesis, Graduate Department of Mechanical and Industrial Engineering, University of Toronto, 252 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Burton, D. et al. (Mar. 2012). "Cell Phone Accessibility: Android Ice Cream Sandwich: Evaluating the Accessibility of Android 4.0," AccessWorld 13(3), located at <http://www.afb.org/afbpress/pub.asp?DocID=aw130302&Mode=Print>, last visited Feb. 19, 2013, 8 pages.

* cited by examiner

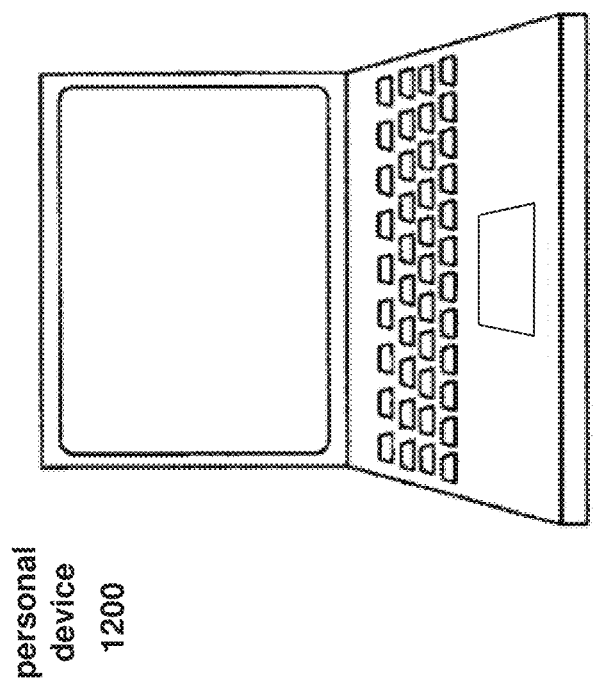

ACTIVATION OF A SCREEN READING PROGRAM

CROSS REFERENCE TO RELATED APPLICATIONS

This application claims the benefit under 35 USC 119(e) of U.S. Provisional Patent Application No. 61/757,038, filed Jan. 25, 2013, the disclosure of which is hereby incorporated by reference in its entirety.

FIELD

This relates generally to electronic devices and, more particularly, to screen-reading programs for electronic devices.

BACKGROUND

The use of computing devices, such as laptops, mobile phones, tablet computers, portable media players, and the like, has increased significantly in recent years. As the use of these computing devices has increased, the need for increased accessibility for people with impaired vision has also increased. For example, low-vision users, blind users, dyslexic users or others with learning disabilities, or even sighted users who simply want or need to use a device without looking at the device during operation can benefit from screen reading programs that audibly read text or describe items being displayed on the device.

Traditional techniques for starting a screen reading program typically rely on using a physical or virtual button. However, there are times when it is advantageous to employ alternative techniques for starting the screen reading program, for example, when there are no physical buttons on the device.

SUMMARY

This relates to activating a screen reading program. One example process can include receiving a request to activate the screen reading program and prompting the user to perform an action to confirm the request. The action can include a making swiping gesture, shaking the device, covering a proximity sensor, tapping a display, or the like. In some examples, the confirming action must be received within a time limit or the input can be ignored. In response to receipt of the confirmation (e.g., within a time limit), the screen reading program can be activated. The time limit can be identified using audible notifications at the start and end of the time limit. In another example, a device can detect an event associated with a request to activate a screen reading program. The event can be detected at any time to cause the device to activate the screen reading program.

Systems for performing the processes described above are also provided.

BRIEF DESCRIPTION OF THE DRAWINGS

FIGS. 10-12 illustrate exemplary personal devices that can be used to activate a screen reading program according to various examples.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

This relates to activating a screen reading program. One example process can include receiving a request to activate the screen reading program and prompting the user to perform an action to confirm the request. The action can include a making swiping gesture, shaking the device, covering a proximity sensor, tapping a display, or the like. In some examples, the confirming action must be received within a time limit or the input can be ignored. In response to receipt of the confirmation (e.g., within the time limit), the screen reading program can be activated. The time limit can be identified using audible notifications at the start and end of the time limit or during some or all of the time limit. In another example, a device can detect an event associated with a request to activate a screen reading program. The event can be detected at any time to cause the device to activate the screen reading program. Systems for performing the processes described above are also provided.

Figure 1:
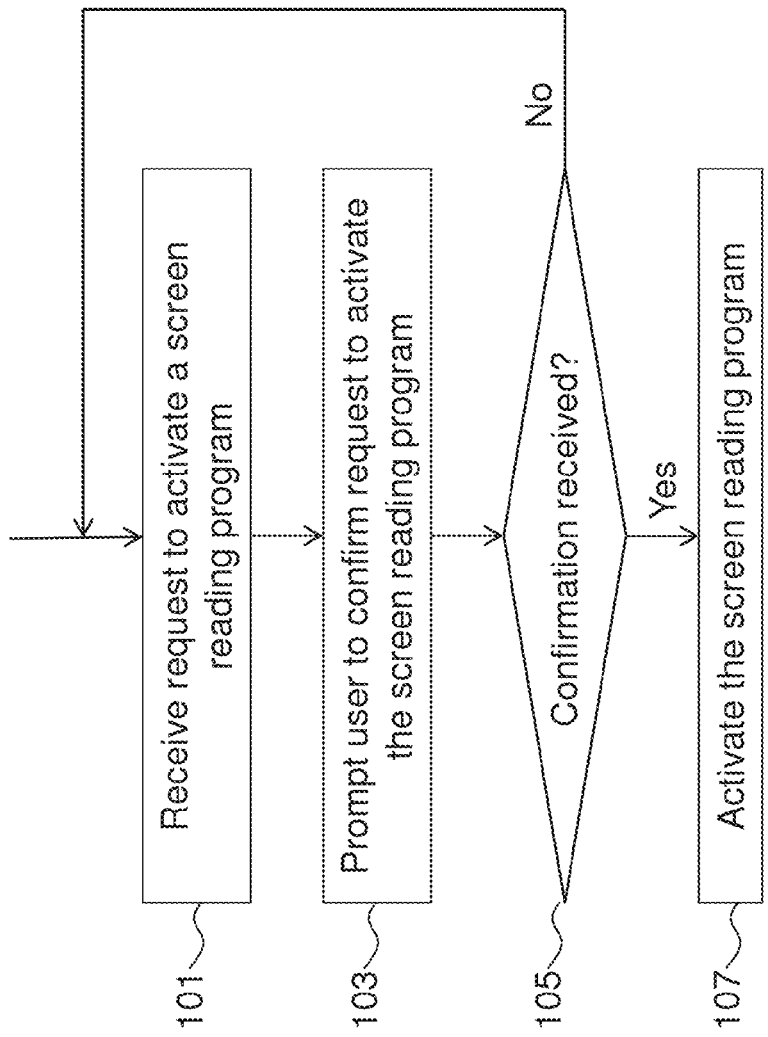
FIG. 1 illustrates an exemplary process for activating a screen reading program according to various examples.

FIG. 1 illustrates an exemplary process 100 for activating a screen reading program according to various examples. Process 100 can be performed by any computing device, such as a desktop computer, laptop computer, mobile phone, tablet computer, portable media device, and the like.

At block 101, a request to activate a screen reading program can be received. In some examples, a computing device can receive a request from a user to activate the device's screen reading program. This request can be received using any input device, such as a keyboard, mouse, touch sensitive display, sensor (e.g., gyroscope, accelerometer, microphone, proximity sensor, etc.), or the like.

Figure 2:
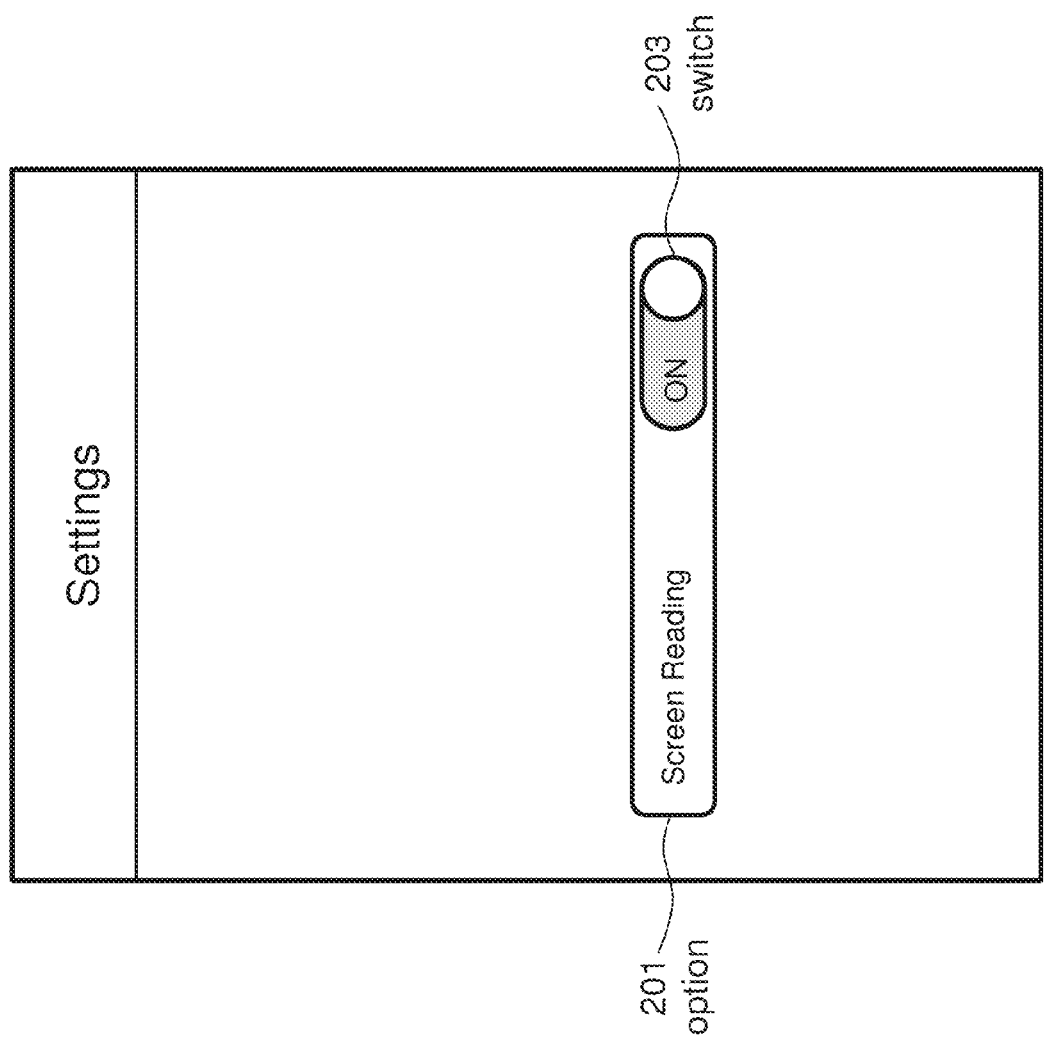
FIG. 2 illustrates an exemplary interface for activating a screen reading program according to various examples.

For example, FIG. 2 illustrates an exemplary interface 200 that can be displayed on a touch sensitive display of a device to enable the user to request activation of the screen reading program. In this example, interface 200 includes a settings menu having a screen reading option 201. Screen reading option 201 includes a virtual ON/OFF toggle switch 203 that can be switched between an "ON" position and an "OFF" position in response to an object touching or hovering above the displayed switch 203. This switch 203 can be used to selectively activate or deactivate the screen reading program. For instance, in response to switch 203 being placed in the "ON" position, the device can interpret the positioning of switch 203 as a request from the user to activate the device's screen reading program. Similarly, in response to switch 203 being placed in the "OFF" position, the device can interpret the positioning of switch 203 as a request from the user to deactivate the device's screen reading program.

While FIG. 2 shows a specific interface 200 for activating a screen reading program, it should be appreciated that other variations may be used. For example, option 201 may include a different type of interface element, such as a pull-down menu, button, or the like, in place of ON/OFF toggle switch 203 for activating/deactivating the screen reading program. Additionally, interface 200 may include other options in addition to screen reading option 201 and the text displayed within interface 200 can also be changed. Interface 200 can also include other menus besides the illustrated settings menu.

Moreover, while a virtual element displayed on a touch sensitive display is described above, it should be appreciated that any other input device can be provided to allow the user to request activation of the screen reading program. For example, a physical switch, a microphone configured to receive voice commands, motion detection sensor configured to detect motion of the device, proximity sensors, or the like can be provided to enable the user to request activation of the screen reading program Referring back to FIG. 1, after receiving a request to activate the screen reading program, process 100 can proceed to block 103. At block 103, the user can be prompted to confirm the request to activate the screen reading program. The prompt can include any audio or visual indication to the user that a confirming action must be taken by the user before activation of the screen reading program can be initiated. The confirming action can be any type of input received using any type of input device included within the device or associated with the device.

Figure 3:
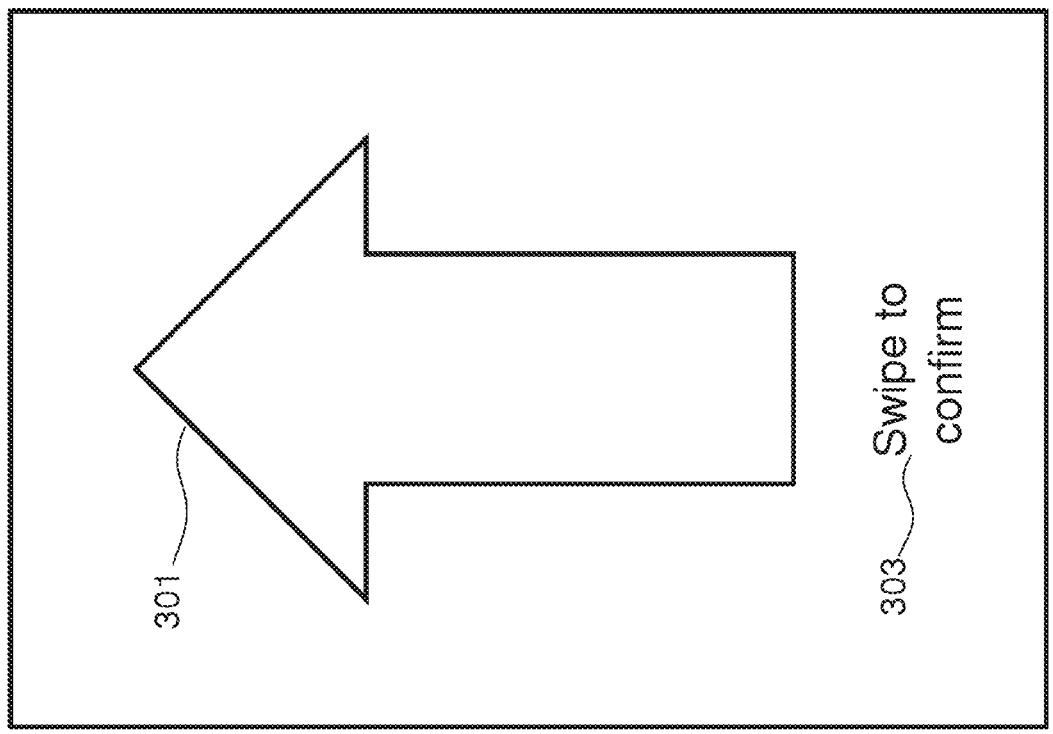
FIGS. 3-7 illustrate exemplary interfaces prompting a user to confirm activation of a screen reading program according to various examples.

For example, FIG. 3 illustrates an exemplary interface 300 that can be used to prompt the user to confirm activation of the screen reading program. Interface 300 can be displayed in response to switch 203 being moved to the "ON" position and can replace interface 200 within the display of the device. As shown, interface 300 includes a visual prompt in the form of arrow 301 and text instructions 303. In this example, the user can be asked to make a swiping gesture across the screen of the device in an upwards direction. In some examples, text instructions 303 can be read aloud by the device to assist vision impaired users or to allow users to use the device without looking at the display.

Figure 4:
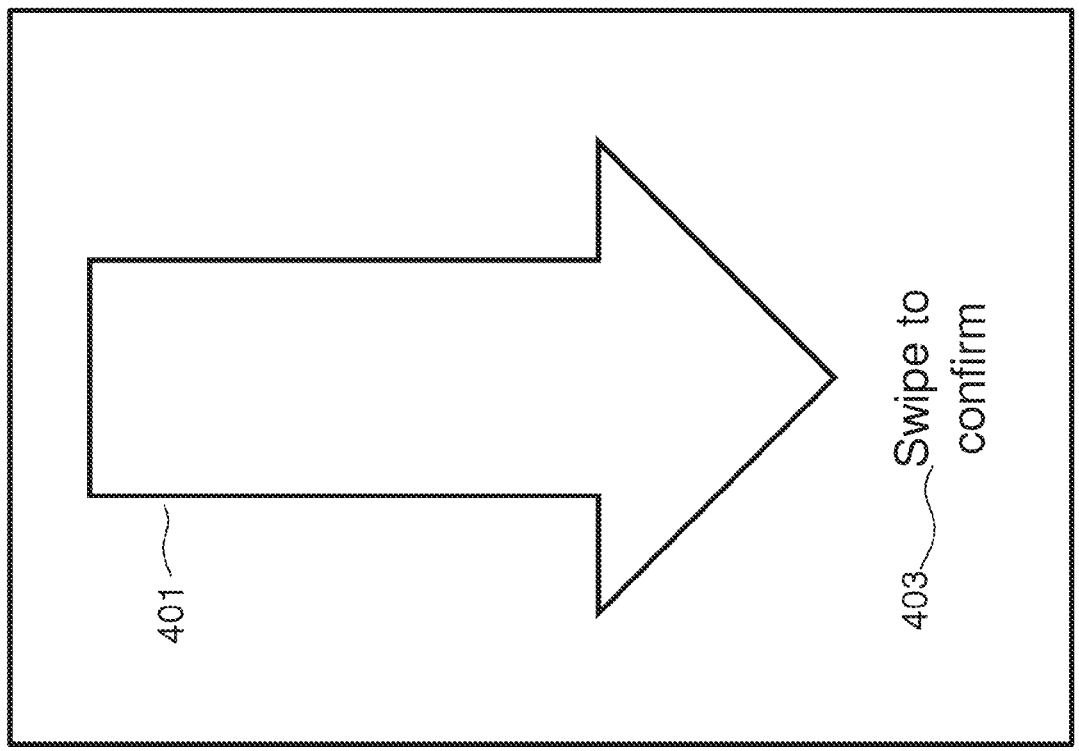
Figure 5:
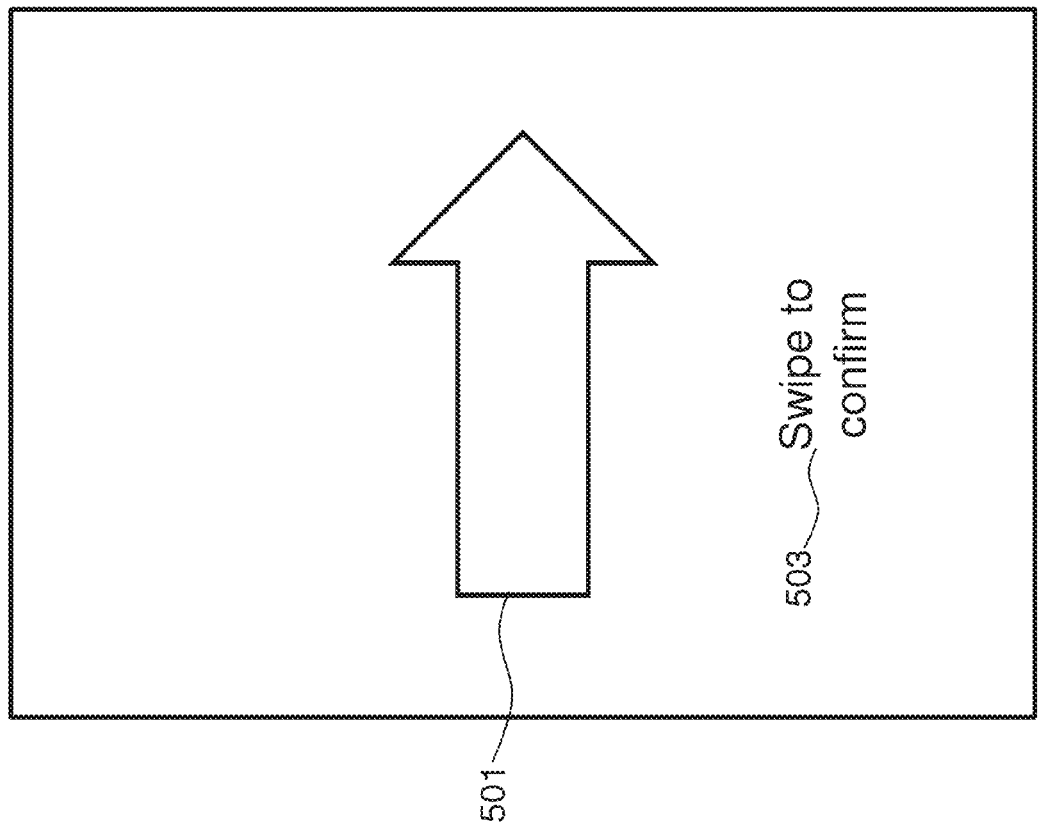
Figure 6:
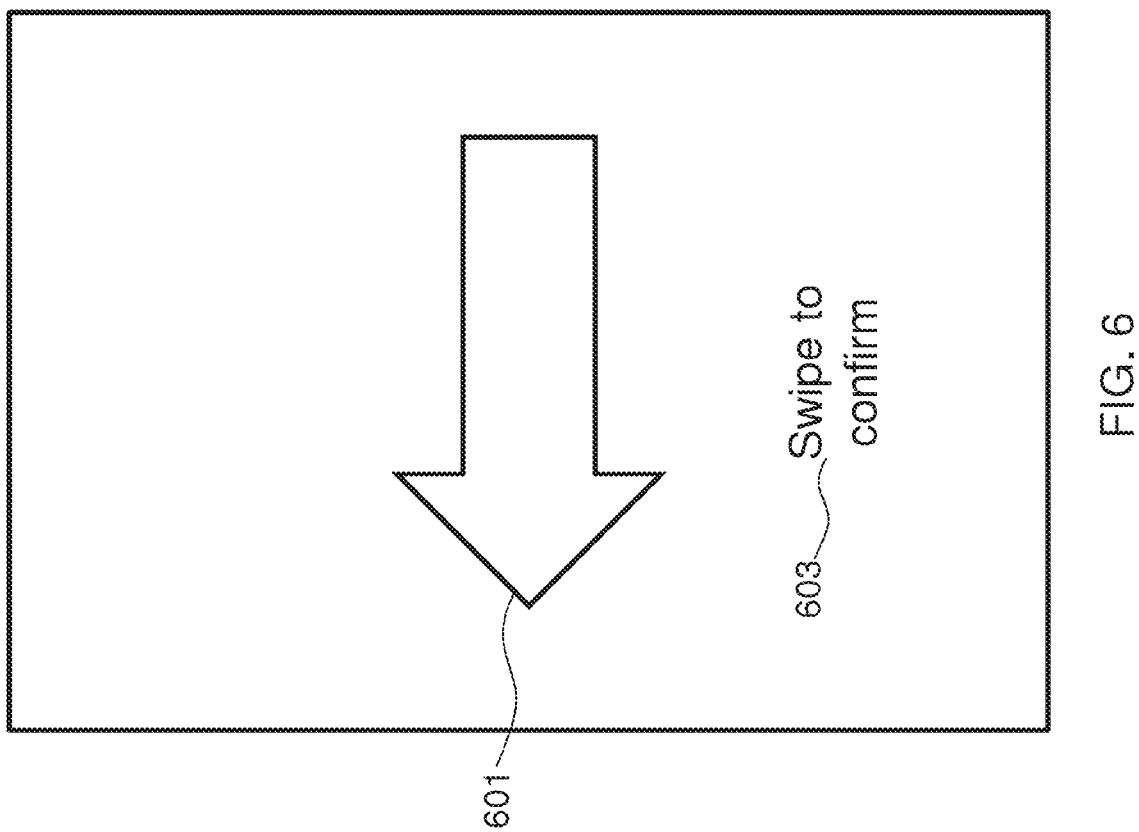

In other examples, the device can prompt the user to perform alternative or additional confirming actions. For example, the device can prompt the user to perform a swiping gesture in a different direction, such as a downward swipe, as shown by interface 400 in FIG. 4. Similar to interface 300, interface 400 can include an arrow 401 and text instructions 403. In yet other examples, the device can prompt the user to perform a swiping gesture in a lateral direction, as shown by interfaces 500 and 600 of FIGS. 5 and 6, respectively. Similar to interfaces 300 and 400, interfaces 500 and 600 can include arrows 501 and 601, respectively, and text instructions 503 and 603, respectively.

Figure 7:
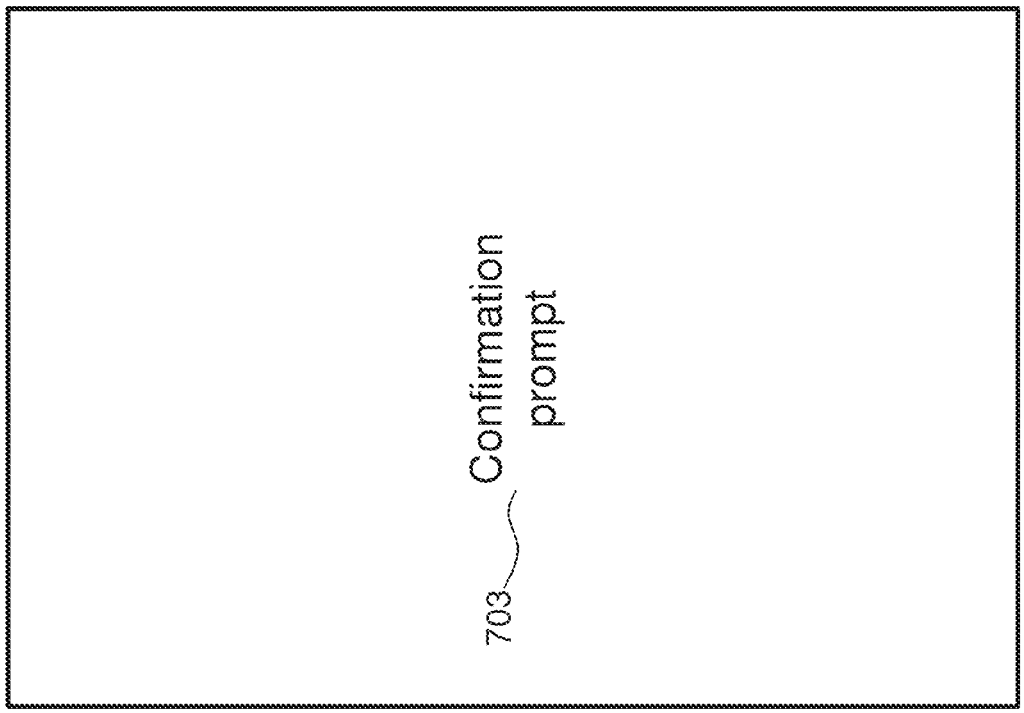

In other examples, the user can be prompted to perform an action other than a swiping gesture. For example, as shown in FIG. 7, an interface 700 having a confirmation prompt 703 can be displayed to the user. In some examples, confirmation prompt 703 can instruct a user to perform a physical manipulation of the device, such as a shaking of the device, with a sufficient force and for a threshold duration of time to confirm the activation of the screen reading program. In these examples, an accelerometer can be used to detect the physical manipulation of the device and the device's clock can be used to measure the duration of the physical manipulation.

In yet other examples, the confirmation prompt 703 can instruct the user to tap the screen of the device a threshold number of times. In these examples, the touch sensor of the device can be used to detect a tapping event received by the device. A timing requirement can be imposed on the tapping events such that the taps must be received within a threshold duration of time of the previous tap. Alternatively, no timing requirement can be imposed on the tapping events.

In yet other examples, the device can prompt the user to repeatedly cover a proximity sensor of the device a threshold number of times. In these examples, the device can include a proximity sensor used to detect successive covering and uncovering of the sensor. Similar to the tapping examples, a timing requirement can be imposed on the covering events such that the covering events need occur for a threshold duration, the uncovering events need occur for a threshold duration, and/or covering events must be received within a threshold duration of the previous covering event. Alternatively, no timing requirement can be imposed on the covering events.

It should be appreciated that confirmation prompt 703 can instruct the user to perform any action that can be detected by the device as an input.

Referring back to FIG. 1, after prompting the user to confirm the activation of the screen reading program, the process can proceed to block 105. At block 105, it can be determined if a confirmation to activate the screen reading program has been received. The device can receive confirmation of activation of the screen reading program by receiving the input requested from the user at block 103. Depending on the prompt presented to the user at block 103, the confirmation received at block 105 can be received from one or more sensors of the device or one or more sensors associated with the device. For example, if the user was prompted to swipe the screen of the device at block 103, the device can receive an indication of the swiping motion from a touch sensor. If the prompt generated at block 103 included a request to shake the device, the confirmation can be received by an accelerometer of the device. If the prompt generated at block 103 included a request to tap the screen of the device a threshold number of times, the confirmation can be received from the touch sensor of the device. If the prompt generated at block 103 included a request to cover and uncover the proximity sensor of the device a threshold number of times, the confirmation can be received from the proximity sensor of the device.

In some examples, a time limit can be imposed on the confirmation requested at block 103. For example, user can be provided with a threshold length of time (e.g., 2, 3, 4, 5, or more seconds) to perform the prompted action. To assist a blind or visually impaired user with the confirmation step, a first audible notification can be generated to indicate the start of the time period for which the user can input the prompted confirmation (e.g., when the user is prompted for a confirmation using an interface similar or identical to any of interfaces 300, 400, 500, 600, or 700). A second audible notification can also be generated in response to the time limit expiring to indicate that the device is no longer accepting the requested confirmation. The first and second audible notification can be the same or different and can include any type of audible notification, such as a bell, chime, phone ring, beep, spoken words, or the like. In other examples, an audible notification can be generated during some or all of the time limit. Alternatively, no audible notification may be used. If the user does not perform the prompted confirming action (or does not perform the confirmation action within the time limit, if imposed), the process can start over with the device waiting for a new request to activate the screen reading program to be received at block 101. In some examples, the device can also cease displaying the prompt and, for example, can display the previously displayed interface (e.g., settings interface similar or identical to interface 200). Additionally, the switch used to request activation of the screen reading program (e.g., switch 203) can be returned to the "OFF" position.

Alternatively, if a confirmation is received from the user (e.g., within the time limit if one is imposed), the process can proceed to block 107. At block 107, the screen reading program can be activated. For example, the device can activate the screen reading program such that the device will provide an audible description or reading of text being displayed on the screen of the device.

Figure 8:
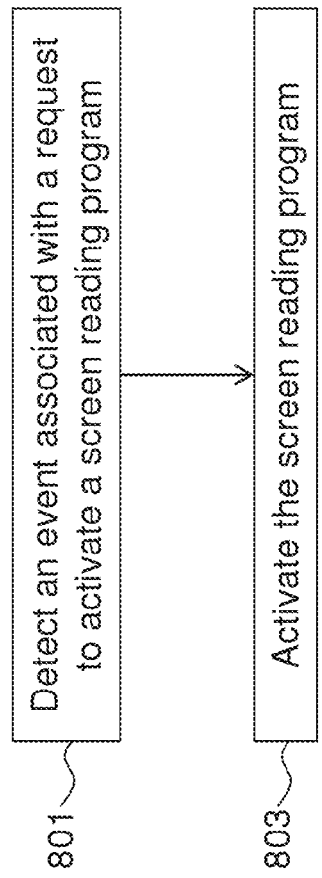
FIG. 8 illustrates another exemplary process for activating a screen reading program according to various examples.

FIG. 8 illustrates another exemplary process 800 for activating a screen reading program. Process 800 can be used alone or in conjunction with process 100. At block 801, an event associated with a request to activate a screen reading program can be detected. In some examples, the event associated with the request to activate the screen reading program can include a physical manipulation event, such as a shaking event, of the device. The shaking event can include a shaking of the device with a threshold force for a threshold duration of time (e.g., 2, 3, 4, 5, or more seconds). In these examples, an accelerometer can be used to detect movement of the device. If the device detects a back and forth movement of the device with a sufficient force, the device can interpret the output of the accelerometer as a shaking of the device. A clock can further be used to measure a duration of the shaking of the device. If a shaking of the device is detected for a threshold duration of time, then the shaking of the device can be interpreted as a shaking event associated with a request to activate the screen reading program.

In other examples, other events associated with a request to activate a screen reading program can be used. These events can include any input or combination of inputs received by an input device included within or associated with the device on which the screen reading program will be activated. Sensors, such as an accelerometer, touch sensor, proximity sensor, microphone, and the like, can be used to detect motion of the device, touch or hover events on the display of the device, motion near the device, or audible commands. The input sensed by these sensors can be used to activate the screen reading program.

In some examples, the event associated with the request to activate the screen reading program can be detected at block 801 at any time. For example, the device can detect the event independent of any menu being displayed or program or application being executed. This obviates the need for the user to enter a specific menu to activate the screen reading program, such as a settings menu, as shown in FIG. 2. Alternatively, the device can require that the user enter a particular menu before such inputs are interpreted as a request to activate the screen reading program.

Once the event associated with the request to activate the screen reading program is detected at block 801, the process can proceed to block 803. At block 803, the screen reading program can be activated. For example, the device can activate the screen reading program such that the device will provide an audible description or reading of text being displayed on the screen of the device.

While the examples provided above refer to activation of a screen reading program, it should be appreciated that the processes described above can be applied to deactivation of a screen reading program in the same way. For example, in process 100, a device can receive a request to deactivate a screen reading program, prompt the user to confirm deactivation of the screen reading program, determine if a confirmation is received, and deactivate the screen reading program in response to receipt of the confirmation. Similarly, in process 800, an event associated with a request to deactivate a screen reading program can be detected and he screen reading program can be deactivated in response to the detection. Alternatively, the device can deactivate the screen reading program in response to the request to deactivate the screen reading program without the additional confirmation steps.

Figure 9:
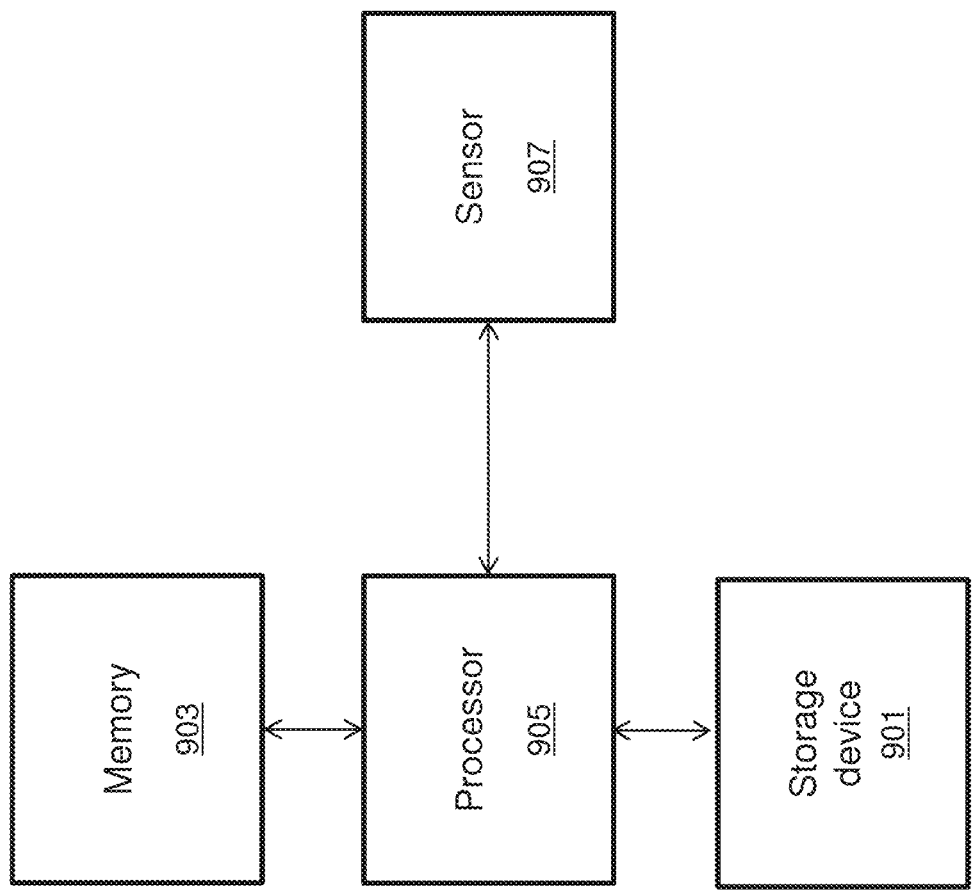
FIG. 9 illustrates an exemplary system for activating a screen reading program according to various examples.

One or more of the functions relating to activating a screen reading program can be performed by a system similar or identical to system 900 shown in FIG. 9. System 900 can include instructions stored in a non-transitory computer readable storage medium, such as memory 903 or storage device 901, and executed by processor 905. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

System 900 can further include sensor 907 coupled to processor 905. Sensor 907 can be operable to receive or detect a request to activate a screen reading program and/or confirmation to activate the screen reading program. In some examples, sensor 907 can include a touch sensor, proximity sensor, accelerometer, or the like. Processor 905 can receive an output signal representative of an input from a user from sensor 907. Processor 905 can be configured to interpret the output signals from sensor 907 as described above with respect to FIGS. 1 and 8. It is to be understood that the system is not limited to the components and configuration of FIG. 9, but can include other or additional components in multiple configurations according to various examples.

Figure 10:
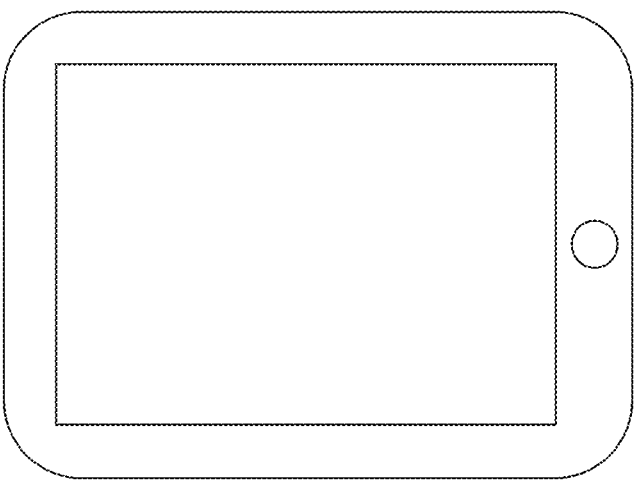

FIG. 10 illustrates an exemplary personal device 1000, such as a tablet, that can be used to activate a screen reading program according to various examples.

Figure 11:
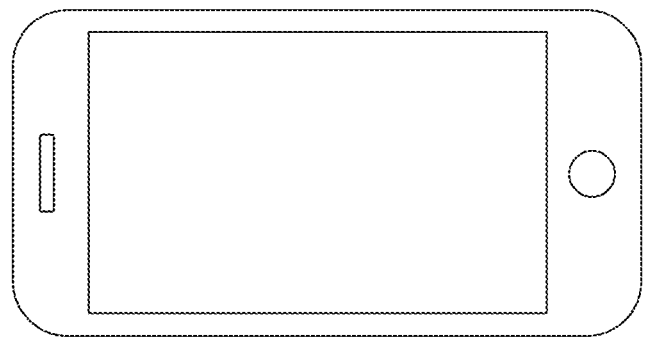

FIG. 11 illustrates another exemplary personal device 1100, such as a mobile phone, that can be used to activate a screen reading program according to various examples.

FIG. 12 illustrates an exemplary personal device 1200, such as a laptop having a touchpad, that can be used to activate a screen reading program according to various examples.

Therefore, according to the above, some examples of the disclosure are directed to a method comprising: receiving, from a user, a request to activate a screen reading program on a device; prompting the user to confirm the request to activate the screen reading program; and activating the screen reading program in response to receiving a confirmation of the request to activate the screen reading program. Additionally or alternatively to one or more of the examples disclosed above, the request to activate the screen reading program can include the user activating a virtual switch displayed on a display of the device. Additionally or alternatively to one or more of the examples disclosed above, prompting the user to confirm the request can include causing a display of an interface comprising instructions to confirm the request by performing an action. Additionally or alternatively to one or more of the examples disclosed above, the action can include a swiping gesture across a screen of the device. Additionally or alternatively to one or more of the examples disclosed above, the action can include a shaking of the device. Additionally or alternatively to one or more of the examples disclosed above, the action can include covering a proximity sensor of the device a threshold number of times.

Other examples of the disclosure are directed to a non-transitory computer readable storage medium comprising computer instructions for: receiving a request to activate a screen reading program on a device; prompting the user to confirm the request to activate the screen reading program within a threshold length of time; generating a first audible notification; generating a second audible notification after the threshold length of time; and activating the screen reading program in response to receiving a confirmation of the request to activate the screen reading program within the threshold length of time. Additionally or alternatively to one or more of the examples disclosed above, the threshold length of time can be 5 seconds. Additionally or alternatively to one or more of the examples disclosed above, the confirmation can include an output from an accelerometer representative of a shaking of the device. Additionally or alternatively to one or more of the examples disclosed above, the confirmation can include an output from a proximity sensor representative of covering and uncovering of the proximity sensor. Additionally or alternatively to one or more of the examples disclosed above, the confirmation can include an output from a touch sensor representative of a swiping motion across the touch sensor. Additionally or alternatively to one or more of the examples disclosed above, the confirmation can include an output from a touch sensor representative of one or more taps on a display of the device.

Other examples of the disclosure are directed to a method comprising: detecting a physical manipulation of a device for a threshold length of time; and activating a screen reading program in response to the detection of the physical manipulation. Additionally or alternatively to one or more of the examples disclosed above, the threshold length of time can be at least 3 seconds. Additionally or alternatively to one or more of the examples disclosed above, the physical manipulation can be a shaking of the device. Additionally or alternatively to one or more of the examples disclosed above, detecting the physical manipulation can include detecting, by an accelerometer, a force exceeding a threshold amount in alternating directions. Additionally or alternatively to one or more of the examples disclosed above, detecting the physical manipulation can occur independent of a menu being displayed by the device. Additionally or alternatively to one or more of the examples disclosed above, detecting the physical manipulation can occur independent of a program or application being executed.

Other examples of the disclosure are directed to a system comprising: a non-transitory computer readable storage medium comprising computer instructions for: receiving a request to activate a screen reading program on a device; prompting the user to confirm the request to activate the screen reading program within a threshold length of time; and activating the screen reading program in response to receiving a confirmation of the request to activate the screen reading program within the threshold length of time; and a processor for executing the computer instructions. Additionally or alternatively to one or more of the examples disclosed above, the system can further include an accelerometer, and receiving confirmation of the request to activate the screen reading program can include detecting, by the accelerometer, a shaking of the device. Additionally or alternatively to one or more of the examples disclosed above, the system can further include a touch sensor, and receiving confirmation of the request to activate the screen reading program can include detecting, by the touch sensor, a swiping motion across the touch sensor. Additionally or alternatively to one or more of the examples disclosed above, the system can further include a touch sensor, and receiving confirmation of the request to activate the screen reading program can include detecting, by the touch sensor, one or more taps on or near the touch sensor. Additionally or alternatively to one or more of the examples disclosed above, the system can further include a proximity sensor, and receiving confirmation of the request to activate the screen reading program can include detecting, by the proximity sensor, covering and uncovering of the proximity sensor. Additionally or alternatively to one or more of the examples disclosed above, the non-transitory computer readable storage medium can further include computer instructions for generating an audible notification during the threshold length of time.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A method comprising:
   at an electronic device with a touch screen:
   receiving a request to activate a screen reading program on a device;
   in response to receiving the request, displaying on the touch screen a graphical interface, the graphical interface comprising instructions to confirm the request by performing one or more actions within a threshold length of time, the one or more actions comprising one or more swiping gesture inputs;
   receiving one or more swiping gesture inputs; and
   in response to receiving the one or more swiping gesture inputs, activating the screen reading program.

2. The method of claim 1, wherein the request to activate the screen reading program comprises the user activating a virtual switch displayed on a display of the device.

3. The method of claim 1, wherein instructions displayed in the graphical interface include a directional indicator.

4. The method of claim 1, wherein the instructions displayed in the graphical interface include a text instruction to perform the one or more swiping gestures to confirm the request.

5. The method of claim 1, wherein the one or more actions comprises a shaking of the device.

6. The method of claim 1, wherein the one or more actions comprises covering a proximity sensor of the device a threshold number of times.

7. A non-transitory computer readable storage medium comprising computer instructions for:
   receiving a request to activate a screen reading program on a device;

in response to receiving the request, displaying a graphical interface, the graphical interface comprising instructions to confirm the request by performing one or more actions within a threshold length of time, the one or more actions comprising one or more swiping gestures;

generating a first audible notification prior to starting the threshold of time;

generating a second audible notification after the threshold length of time;

receiving one or more swiping gesture inputs; and activating the screen reading program in response to receiving the one or more swiping gestures within the threshold length of time.

8. The non-transitory computer readable storage medium of claim 7, wherein the threshold length of time is 5 seconds.

9. The non-transitory computer readable storage medium of claim 7, wherein the confirmation comprises an output from an accelerometer representative of a shaking of the device.

10. The non-transitory computer readable storage medium of claim 7, where a confirmation of the request comprises an output from a proximity sensor representative of covering and uncovering of the proximity sensor.

11. The non-transitory computer readable storage medium of claim 7, wherein a confirmation of the request comprises an output from a touch sensor representative of a swiping motion across the touch sensor.

12. The non-transitory computer readable storage medium of claim 7, wherein a confirmation of the request comprises an output from a touch sensor representative of one or more taps on a display of the device.

13. A method comprising:

at an electronic device with a touch screen:

receiving a request to activate a screen reading program on a device;

in response to receiving the request, displaying on the touch screen a graphical interface, the graphical interface comprising instructions to confirm the request by performing one or more actions within a threshold length of time, the one or more actions comprising a physical manipulation of the device, wherein the physical manipulation is a shaking of the device;

detecting the physical manipulation of the device for the threshold length of time; and activating a screen reading program in response to the detection of the physical manipulation for the threshold length of time.

14. The method of claim 13, where the threshold length of time is at least 3 seconds.

15. The method of claim 13, further comprising:

performing a different function than activating the screen reading program in response to detecting the physical manipulation for less than the threshold length of time.

16. The method of claim 13, wherein detecting the physical manipulation comprises detecting, by an accelerometer, a force exceeding a threshold amount in alternating directions.

17. The method of claim 13, wherein detecting the physical manipulation occurs independent of a menu being displayed by the device.

18. The method of claim 13, wherein detecting the physical manipulation occurs independent of a program or application being executed.

19. A system comprising:

a non-transitory computer readable storage medium comprising computer instructions for:

receiving a request to activate a screen reading program on a device;

in response to receiving the request, displaying a graphical interface, the graphical interface comprising instructions to confirm the request by performing one or more dynamic inputs within a threshold length of time, wherein the one or more dynamic inputs comprises at least one of a swiping gesture or a shaking of the device; and in response to receiving the one or more dynamic inputs within the threshold length of time, activating the screen reading program; and a processor for executing the computer instructions.

20. The system of claim 19, further comprising an accelerometer, wherein the one or more inputs comprises a shaking input detected by the accelerometer.

21. The system of claim 19, further comprising a touch sensor, wherein the one or more inputs comprises one or more swiping motions detected by the touch sensor.

22. The system of claim 19, further comprising a touch sensor, wherein the one or more inputs comprises one or more taps detected by the touch sensor.

23. The system of claim 19, further comprising a proximity sensor, wherein by the one or more inputs comprises covering the proximity sensor.

24. The system of claim 19, wherein the non-transitory computer readable storage medium further comprises computer instructions for:

generating an audible notification during the threshold length of time.

* * * * *